United States Patent [19]
Schack et al.

[11] 3,780,490
[45] Dec. 25, 1973

[54] SHAPED AND FORMED MEAT PRODUCTS MANUFACTURE

[75] Inventors: Warren R. Schack, Western Springs; Francis Glenn Connick, Downers Grove, both of Ill.

[73] Assignee: Swift & Company, Chicago, Ill.

[22] Filed: Feb. 5, 1973

[21] Appl. No.: 329,326

Related U.S. Application Data

[62] Division of Ser. No. 141,492, May 10, 1971, Pat. No. 3,730,740.

[52] U.S. Cl. ............... 53/122, 53/124 D, 53/124 E, 100/DIG. 10, 141/71
[51] Int. Cl. ............................................ B65b 63/02
[58] Field of Search ............ 53/122, 124 D, 124 E; 100/DIG. 10; 425/246; 141/71, 81, 249

[56] References Cited
UNITED STATES PATENTS

| | | |
|---|---|---|
| 3,123,958 | 3/1964 | Carruthers .................. 53/124 D X |
| 3,186,140 | 6/1965 | Bogdanovich .................. 53/124 D |

*Primary Examiner*—Travis S. McGehee
*Attorney*—Edward T. McCabe et al.

[57] ABSTRACT

Method and apparatus for rapid and accurate filling of meat containers with solid meat pieces having the muscle fibers thereof arranged in substantial parallel alignment with the longest dimension of the meat container to produce an improved appearance and melding of the meat surfaces into a superior unitary product. The solid meat pieces are passed under a constant positive pressure through a side wall of a volumetric forming chamber along a horizontal plane and in the direction of the longitudinal axis thereof and thereafter the formed product is transferred intact to an identically shaped container.

9 Claims, 3 Drawing Figures

SHAPED AND FORMED MEAT PRODUCTS MANUFACTURE

This is a division, of application Ser. No. 141,492, filed May 10, 1971 now U.S. Pat. No. 3,730,740.

This invention relates generally to an improved method and apparatus for rapid packing of solid meat pieces into containers; and more specifically relates to the accurate filling of containers with sectioned and formed meat pieces having the muscle fibers in a substantial parallel alignment with one another and with a major axis of the container.

Recent developments in meat canning technology have led to the manufacture of sectioned and formed meats. The term, "sectioned and formed" as herein used, connotes the separation of muscles and/or pieces of muscles to remove excess concentrations of fat therefrom and the forming of these trimmed muscles and/or pieces into a shaped unitary meat mass which has an improved appearance of a solid piece of meat. Sectioned and formed meat products have gained a greater consumer appeal primarily because of an improved appearance resulting from the elimination of waste parts, such as skin and bones, and improved texture and flavor resulting from a more even distribution of the fat content. Such meat products also allow containers to be manually filled more efficiently and rapidly than was possible with large single pieces of meat. They also provide the opportunity for greater mechanization of filling meat containers. However, high speed stuffing and processing of meat containers, such as cans, which are cooked to pasteurization or shelf-stable temperatures is not without complications, particularly when large meat pieces are used. In exact weight filling operations of solid meat pieces it is difficult to eliminate pockets or voids of cooked-out meat juices, and to obtain firm knitting or melding of the meat surfaces to give the appearance of a single solid piece of meat. The stuffing of a large solid piece of meat into a container is easily done manually and may be accomplished on a semi-automatic press at a slow rate of speed. The resulting product of this type processing does not form as compact or uniform a meat product as can be formed from canning large pieces of trimmed meat.

There are certain problems which are generally encountered in the exact weight filling and canning of large pieces of meat. When the filled material reaches the proper weight, care must be taken to cut the meat uniformly to insure a satisfactory appearing final product. Generally, the cutting for exact weight filling operations has required considerable rehandling of the meat which results in a slow and cumbersome operation. For example, when canning ham the exact weight adjustment is made by manually cutting from or adding to the solid piece of meat in the can; and when meat is added, such as in the form of a plug, it generally does not properly adhere to the rest of the meat body. Also, the removal of substantial portions of meat, such as from 2 ounces to about 2 pounds, is generally not possible without disturbing the shape and the surfaces of the canned meat. Once the meat pieces have been stuffed into forming containers any disturbance of the product thereafter will produce a non-uniformity and a lack of melding of the meat surfaces, particularly those surfaces adjacent to the area where the meat was removed or added. Such disturbances result in lower yields because voids, juice pockets and poor knitting of the meat surfaces are produced in the cooked product.

Heretofore mechanized ham stuffers have passed the product directly from a filling spout positioned over a can directly into the can which results in a heterogeneous arrangement of the meat fibers and portions, particularly in the canning of shaped and formed meat products, and hence do not produce the highly desirable appearance of a unitary meat product.

Therefore, it is an object of the present invention to provide an improved method and apparatus for the rapid and accurate stuffing or canning of sectioned and formed solid meat pieces which produces an improved melding of the different meat pieces and produces a superior unitary appearance in the final product.

Another object of the present invention is to provide an apparatus for the semi-automatic or automatic, pressurized filling of solid meat pieces having the muscle fibers in substantial parallel alignment with the longest dimension of the container, into volumetric forms from which they are transferred intact directly into identically shaped containers.

The method of the present invention basically involves the passing, from a suitable source or reservoir, of solid meat pieces under a constant positive pressure through an orienting zone in which the meat pieces are aligned with one another, and forming the aligned meat pieces in a packing zone conforming to the shape and volume of the container in which the product is to be packaged and subsequently processed. As the meat pieces are passed, in substantial parallel alignment with one another, from the orienting zone into the packing zone, they move in a direction along a major axis of the packing zone thereby producing a superior unitary appearance in the final product. After each packing zone is filled, any excess meat is severed at the entrance thereof and the formed product is then transferred intact to an identically shaped container. As the formed product is being transferred into a container at the canning zone, additional product may be simultaneously formed at the packing zone.

An apparatus for performing the foregoing steps includes means for passing a stream of solid meat pieces under a constant positive pressure through an orienting zone to align the meat pieces with one another, and into a forming cavity by passing the aligned meat pieces in a direction along a major axis of the cavity until all voids therein are removed and the meat pieces are packed substantially parallel to each other and to the axis of the forming cavity, and means for transferring the formed product intact from the forming cavity to an identically shaped container.

Further objects and advantages will become apparent upon reading the following detailed disclosure of the preferred embodiment of the invention, in conjunction with the drawings wherein.

Figure 1:
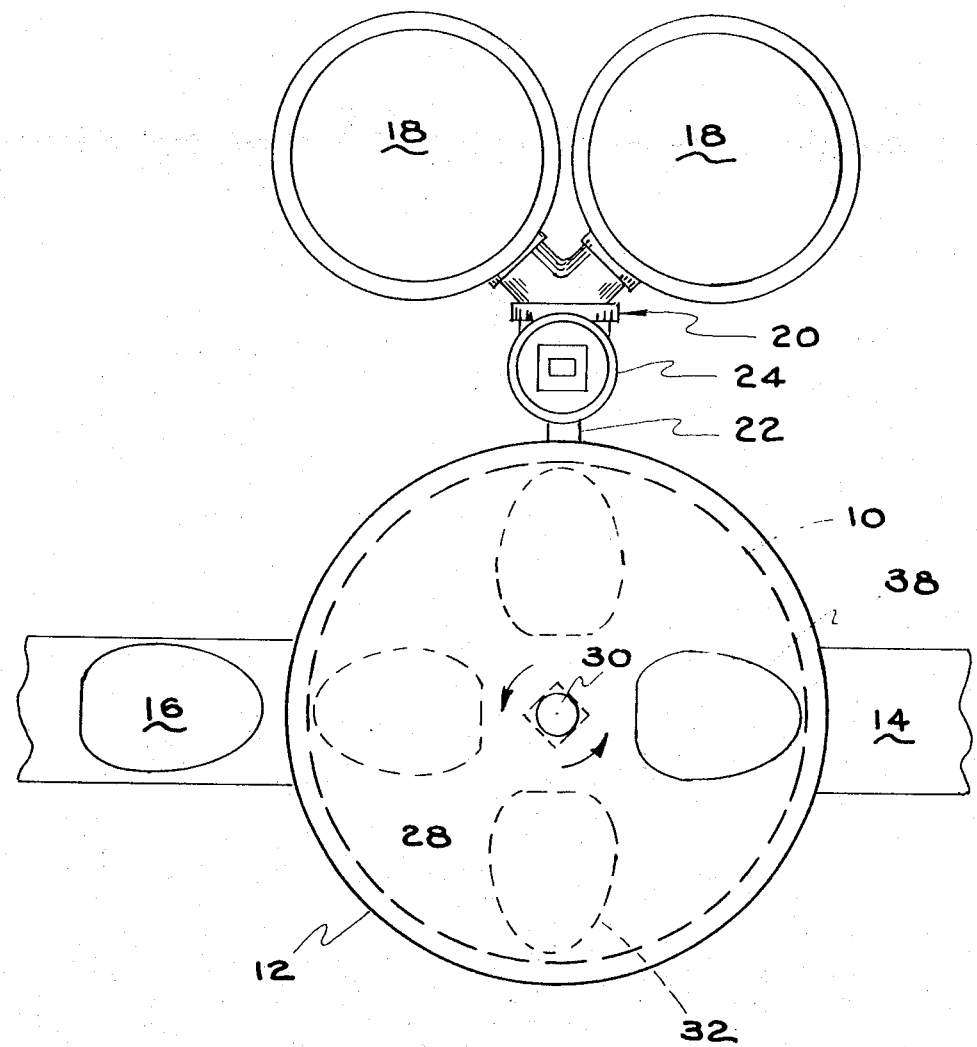
FIG. 1 is a top view of a preferred apparatus embodiment of the present invention with certain parts removed for clarity.

The present invention is of particular advantage in the filling of "pear-shaped" cans with sectioned and formed solid meat pieces. This type of container is well known in the art and is generally used in the canning of ham. The ham is prepared by first skinning, deboning, removing excess fat concentrations and separating the various muscles. According to known sectioned and formed techniques the muscle portions can be made sufficiently pliable so as to be capable of extensive re-shaping and stretching to the point at which they can be pumped or stuffed through sausage filling equipment. However, we have found that the muscle fibers of each meat piece remain intact and interconnected and can be oriented and aligned when reformed in any shape container, such as a pear-shaped can, to give the appearance of a solid piece of meat.

One particular feature of a sectioned and formed product is that it allows for more even distribution of a necessary quantity of fat throughout the product, which makes the product more commercially acceptable. The product prepared in accordance with this improved method is more firmly melded together and as a result can be thinly sliced without crumbling and the muscle fibers are more uniformly arranged to give a more unitary and natural appearance than was heretofore possible.

Both the superior sliceability and the improved unitary appearance of the product result from a technique we call "radial filling." This expression refers to a direction in line with the major or longest axis of the resultant product and which may be other than the direction in which the product is normally placed in a container. For example, radial filling of product for a pear-shaped can would involve passing the product in a direction parallel to the major dimension of the can and perpendicular to an axis passing centrally through the conventional top and bottom of such can. Sectioned and formed meat pieces can be moved from a suitable supply source such as a reservoir or stuffer by a variety of means including ordinary conveyers, or various pressure means.

In the preferred embodiment of this invention a large quantity of pliable, sectioned and formed, meat pieces are maintained under pressure in two large sausage stuffers and are discharged or pumped through an orienting zone which by its diameter and elongated passage aligns the meat pieces parallel with one another. From the orienting zone the aligned meat pieces are passed under a constant positive pressure into a packing zone from which they are transferred to a container.

After the meat pieces are passed under a constant positive pressure through the orienting zone, they are passed lengthwise into a packing zone wherein the meat pieces are arranged in substantial parallel alignment with one another and with the longest dimension of the packing zone. Generally, the meat pieces range in weight from about one-half to about 3 lbs., or even larger, and range in diameter up to about the size of a man's fist. In order to discharge the meat from a stuffer, through the orienting zone and into the packing zone, substantial pressure is required. Therefore, by exerting a constant positive pressure of from about 90 to about 120 psig the meat pieces are passed through the orienting zone into a packing zone until all voids have been removed. Since the meat density remains substantially constant under a given pressure, it is possible to obtain acceptable uniformity of weight in packing zones of identical dimensions. As previously stated, the aligned meat pieces are passed from the orienting zone and into the packing zone along a horizontal plane and parallel to the longitudinal or major axis of the packing zone.

After the meat pieces are shaped and formed into a unitary mass and all the voids have been removed in the packing zone, any excess meat is severed at the entrance of the packing zone and the formed product is transferred to an identically shaped container in which the product is processed in the customary manner. Heretofore, it has been the usual practice to either pack the container manually or to expel unaligned meat pieces through the open top of the container thereby producing a heterogeneous arrangement of the different meat pieces and a distinctly non-unitary appearance in the final product. This heterogeneous arrangement not only tends to seriously detract from the unitary appearance of the product but also adversely affects the cohesiveness of the finished product, particularly when being thinly sliced.

The method will be more fully understood upon examination of a preferred embodiment of apparatus shown in the FIGURES. A rotating turret 10 is encased in a stationary turret housing 12 which is positioned over a suitable can conveyor 14 which both supplies empty containers 16 to be filled, and removes the filled containers for subsequent processing.

A reservoir means for supplying a continuous supply of pliable, solid meat pieces under a constant positive pressure is shown in FIG. 1 as a pair of stuffers generally 18, of which only one stuffer is used as a supply at a given time. An orienting zone generally 20 comprises an elongated passage 22 and connects the stuffers 18 with the turret housing 12. A three-way valve 24 is located in the passage 22 for connecting only one of the stuffers 18 with the turret housing 12 at a given time.

The stationary turret housing 12 encircles the outer periphery of the rotating turret 10; and a bottom turret housing plate 26 is attached to the bottom surface of the turret housing 12, and a top turret housing plate 28 similar to the bottom turret housing plate 26 is attached to the top surface turret housing 12 to complete the enclosure of turret 10. The turret head 10 is rotated by means of shaft 30 fitted through a central way in the turret and driven by a power source (not shown).

The turret 10 is provided with a plurality of volumetric forming cavities 32 each spaced equidistant from the center of the turret and from adjacent cavities. Each cavity 32 is of uniform dimensions and is oriented to place the major dimensions radial to shaft 30 and the smallest dimension chord-like to the periphery of turret 10.

The turret housing 12 is equipped with a filling spout 34 (or fitting) in wiping contact with the rotatable turret 10 for connecting the elongated passage 22 and successive volumetric forming cavities 32 when aligned therewith for filling. The power source is operated intermittently to drive the turret 10 stepwise so as to place each successive cavity 32 in communication with the spout 34 for a brief period sufficient to fill same from the stuffers 18. Movement of the turret 10 will serve to sever the meat at the spout 34 and the periphery of the turret 10 wiping against the spout 34 will block further movement of the meat until the next cavity 32 is stopped in position for filling.

Stepwise beyond the packing zone position aligned with spout 34 transfer means generally 36 is located to eject product from a cavity 32 into a container 16. The transfer means cooperates with ports 38 and 38', (prime) respectively, in each of the top and bottom turret plates 28, 26 and comprises a mold plunger 40 positioned above the top plate 28 and in vertical alignment with the plunger ports 38 and 38'. The plunger 40 is mounted for vertical reciprocation on a plunger rod 42 powered by an air cylinder 44 attached to the plunger rod 42 for both extending and retracting the mold plunger 40 in a vertical direction through the plunger ports 38, 38' during the period a filled cavity 32 is registered therewith.

In operation an empty container 16 on conveyor 14 is positioned directly beneath and congruent to the plunger ports 38 and 38' by any suitable means. The plunger air cylinder 44 is actuated thereby extending the plunger rod 42 and mold plunger 40 downward through the plunger ports 38, 38' to transfer a unit of pre-shaped and formed product intact to the container 16 positioned in vertical alignment thereunder. The filled container is then removed and another empty container is aligned beneath the plunger ports 38, 38' ready for filling.

In operation, as each filled forming cavity 32 is positioned beneath the transfer means 36 another forming cavity 32 is automatically positioned at the filling spout 34. The product in the orienting zone 20 is maintained at a constant pressure of between 90 and 120 psig, and as each cavity 32 is aligned with the filling spout 34 the product is passed through an orifice 46 in an outer peripheral side of the forming cavity 32 until it is completely filled and the pressure of the forming cavity 32 is equal to that of the forming zone 20.

As the pressure equalizes, the turret shaft 30 is actuated either manually or by other suitable means, to index the turret head 10 one step sufficient to bring the next forming cavity 32 into a position in alignment with the spout 34.

Since each forming cavity is open at both top and bottom of the rotatable turret 10, the top and bottom turret plates 28, 26, serve as top and bottom enclosures, respectively, for each forming cavity 32 positioned at the filling spout 34. Any excess meat extending through the entrance of the filled forming cavity 32 is severed by the shearing action of the cavity orifice 46 across the filling spout 34 as the turret head 10 is rotated. The continuous pressure of the product in the orienting zone prevents any product from being withdrawn from the filled forming cavity 32 during the shearing process. The periphery of the rotating turret 10 acts as a seal against the filling spout 34 to prohibit the passage of any product as the turret head 10 is being rotated.

Figure 2:
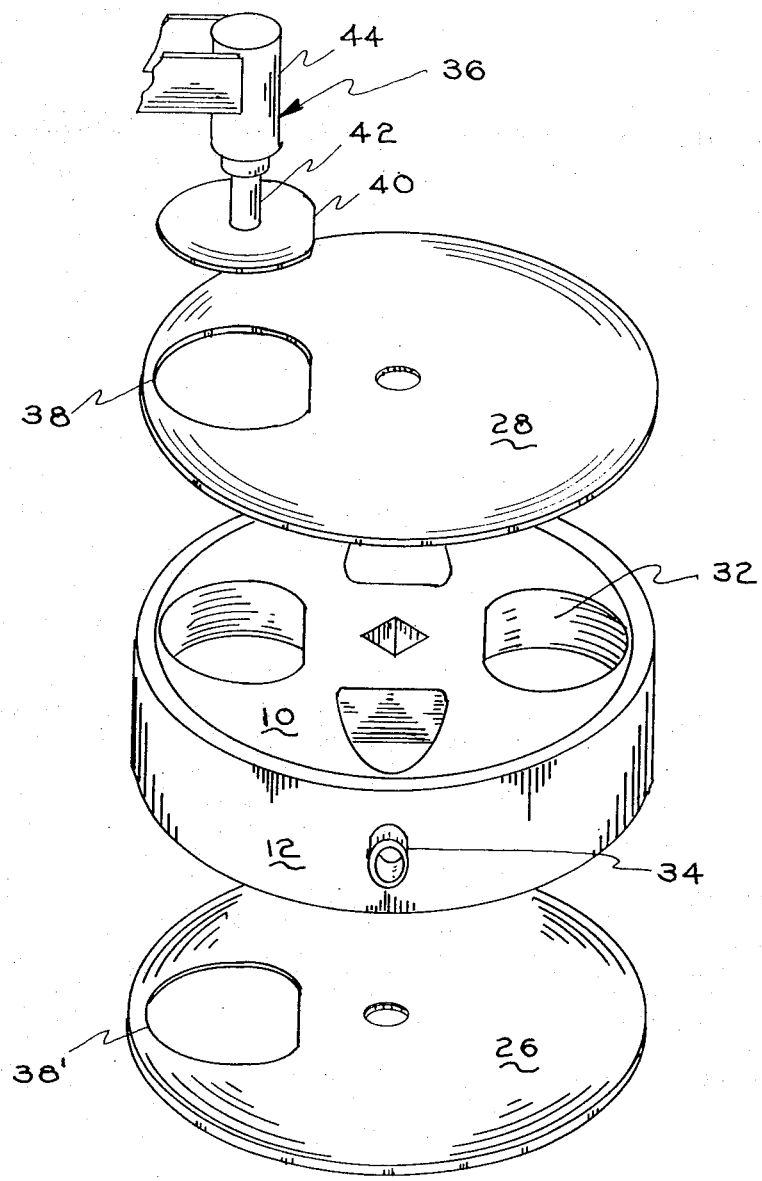
FIG. 2 is a perspective view of a portion of the apparatus shown in FIG. 1.
Figure 3:
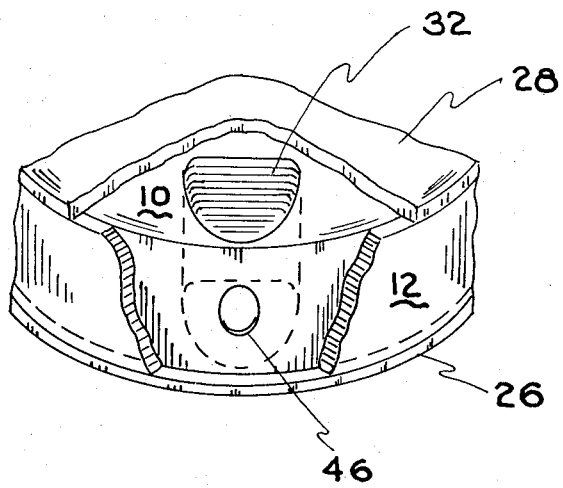
FIG. 3 is a partial perspective view of a portion of the apparatus shown in FIG. 2 showing the volumetric forming cavity in greater detail.

As required, the three-way valve 24 may be actuated to connect either of the stuffers 18 to the passage 22 as the other stuffer is being filled. It will become apparent to those skilled in the art that each or any combinations of the various operations and elements of apparatus may be operated manually, semi-automatically or made fully automatic. In addition, many modifications will be readily apparent to those skilled in the art such as positioning additional stuffers and orienting zone on the side opposite of those shown in FIG. 2 with an additional canning position opposite from that shown in FIG. 3 in order to double the capacity of the instant apparatus.

Obviously many modifications and variations of the invention as hereinbefore set forth may be made without departing from the spirit and scope thereof, and, therefore, only such limitations should be imposed as indicated in the appended claims.

We claim:

1. An apparatus for the automatic radial filling of containers with large solid meat pieces to obtain more uniformly accurate quantities and a superior unitary appearance, comprising:

a resevoir means for storing quantities of solid meat pieces;

an orienting passage having a filling-spout at one end and a receiving end operatively connected to the resevoir means, said passage aligning the solid meat pieces substantially parallel to one another as they are passed from the resevoir means to the filling-spout in a continuous stream by means of a constant positive pressure of from about 90 to about 120 psig;

a plurality of volumetric forming cavities, each forming cavity having an identical shape and capacity as the container, the forward sidewall of the forming cavity being operatively connected by an orifice to the filling-spout to provide for the radial filling along the longest horizontal dimension of the forming cavity;

a severing means positioned at the juncture of the orifice in the forward sidewall of the forming cavity and the filling-spout, said severing means automatically exerting a shearing force to sever any meat pieces protruding from the forming cavity after a substantial equilibrium of the pressure in both the orienting passage and the forming cavity has been obtained;

a transfer means for moving one forming cavity from the filling-spout to a canning station simultaneously as another forming cavity is positioned at the filling-spout; and a canning means positioned in vertical alignment above the container and the forming cavity at the canning station to remove the formed product intact from the forming cavity to container thereunder.

2. The apparatus of claim 1 wherein the resevoir means comprise a pair of sausage stuffers connected together by a suitable valve means, said valve means being connected to each stuffer and to the orienting passage for closing one stuffer and operatively connecting the other stuffer to the orienting passage for a continuous stream of solid meat pieces therethrough.

3. The apparatus of claim 1 wherein the transfer means comprises:

a stationary housing, said housing having a cylindrical sidewall, and both a top and a bottom plate secured to the top and bottom of the sidewall respectively;

a circular rotating turret positioned within the stationary housing;

a suitable actuating means for rotating the turret; and a plurality of volumetric forming cavities, each positioned an equal distance from each other and from the axis of the turret and also spaced to automatically position a forming cavity at the filling-spout whenever another such cavity is positioned at the canning station.

4. The apparatus of claim 1 wherein the severing means comprises:

a filling-spout attached to the exhaust end of the orienting passage and the orifice through the forward sidewall of each forming cavity, said filling-spout extending through the cylindrical sidewall of the stationary housing and is aligned with and contacting the orifice through the forward wall of the forming cavity;

the contacting edges of the stationary filling-spout and the orifice produce a shearing action for severing any meat protruding from the forming cavity as the cavity is transferred from the filling-spout to the canning station.

5. The apparatus of claim 1 wherein the forming cavity is pear-shaped.

6. The apparatus of claim 1 wherein the orienting passage comprises an elongated tubular passage connecting the resevoir means with the forming cavity, said orienting passage having a diameter sufficiently large for admitting and passing the solid meat pieces of the desired size therethrough in parallel alignment with one another.

7. The apparatus of claim 1 wherein the canning means comprise:

a plunger port through both the top and bottom plates of the stationary housing and both ports are vertically aligned with a forming cavity positioned therebetween and with a container positioned thereunder;

a plunger positioned above the ports and in vertical alignment therewith;

a plunger-rod operatively attached to the plunger;

an air cylinder attached to the plunger-rod for extending the plunger vertically through both ports and the forming cavity therebetween for transferring the formed product intact to the container positioned thereunder.

8. The apparatus of claim 1 wherein at least 4 filling cavities are evenly spaced within the rotating turret; a pair of filling-spouts are operatively connected in opposite sides of the stationary housing; and two canning means are spaced opposite the other and are equal distance between the filling-spouts, whereby in operation dual filling and canning operations are performed simultaneously.

9. The apparatus of claim 8 wherein each filling-spout is operatively connected to separate resevoir means.

* * * * *

UNITED STATES PATENT OFFICE
CERTIFICATE OF CORRECTION

Patent No. 3,780,490          Dated December 25, 1973

Inventor(s) Warren R. Schack and Francis Glenn Connick

It is certified that error appears in the above-identified patent and that said Letters Patent are hereby corrected as shown below:

Column 4, line 66 - cancel "(prime)";

Column 5, line 32 - cancel "turrent" and substitute therefor --turret--;

Column 6 - Claim 1 was not amended per Amendment Under Rule 312 (Communication from Patent Office dated October 1, 1973 advised amendment was entered); lines 6, 10 and 12 - cancel "resevoir" and substitute therefor --reservoir--; line 47 - cancel "transfer" and substitute therefor --movable--;

Column 7, line 18 - cancel "canning" and substitute therefor --transfer--;

Cancel claims 8 and 9.

Signed and sealed this 16th day of July 1974.

(SEAL)
Attest:

McCOY M. GIBSON, JR.
Attesting Officer

C. MARSHALL DANN
Commissioner of Patents